Dec. 17, 1963 H. W. FULLER 3,114,898

MAGNETIC INTERDOMAIN WALL SHIFT REGISTER

Filed Dec. 11, 1961 7 Sheets-Sheet 1

$\theta_1 = \theta_2 = 0$
$a = b$

INVENTOR.
HARRISON W FULLER
BY E MacKay Fraser
ATTORNEY

Dec. 17, 1963 H. W. FULLER 3,114,898

MAGNETIC INTERDOMAIN WALL SHIFT REGISTER

Filed Dec. 11, 1961

7 Sheets-Sheet 2

INVENTOR.
HARRISON W. FULLER

BY E MacKay Fraser

ATTORNEY

INVENTOR.
HARRISON W. FULLER
BY E MacKay Fraser
ATTORNEY

INVENTOR.
HARRISON W. FULLER
BY E MacKay Fraser
ATTORNEY

INVENTOR.
HARRISON W. FULLER
BY E. MacLay Fraser
ATTORNEY

INVENTOR.
HARRISON W. FULLER
BY E. MacKay Fraser
ATTORNEY

MAGNETIC INTERDOMAIN WALL SHIFT REGISTER

Filed Dec. 11, 1961

INVENTOR.
HARRISON W. FULLER
BY
ATTORNEY

United States Patent Office 3,114,898

Patented Dec. 17, 1963

3,114,898

MAGNETIC INTERDOMAIN WALL SHIFT REGISTER

Harrison W. Fuller, Needham Heights, Mass., assignor to Laboratory For Electronics, Inc., Boston, Mass., a corporation of Delaware Filed Dec. 11, 1961, Ser. No. 158,494

8 Claims. (Cl. 340—174)

Figure 1A:
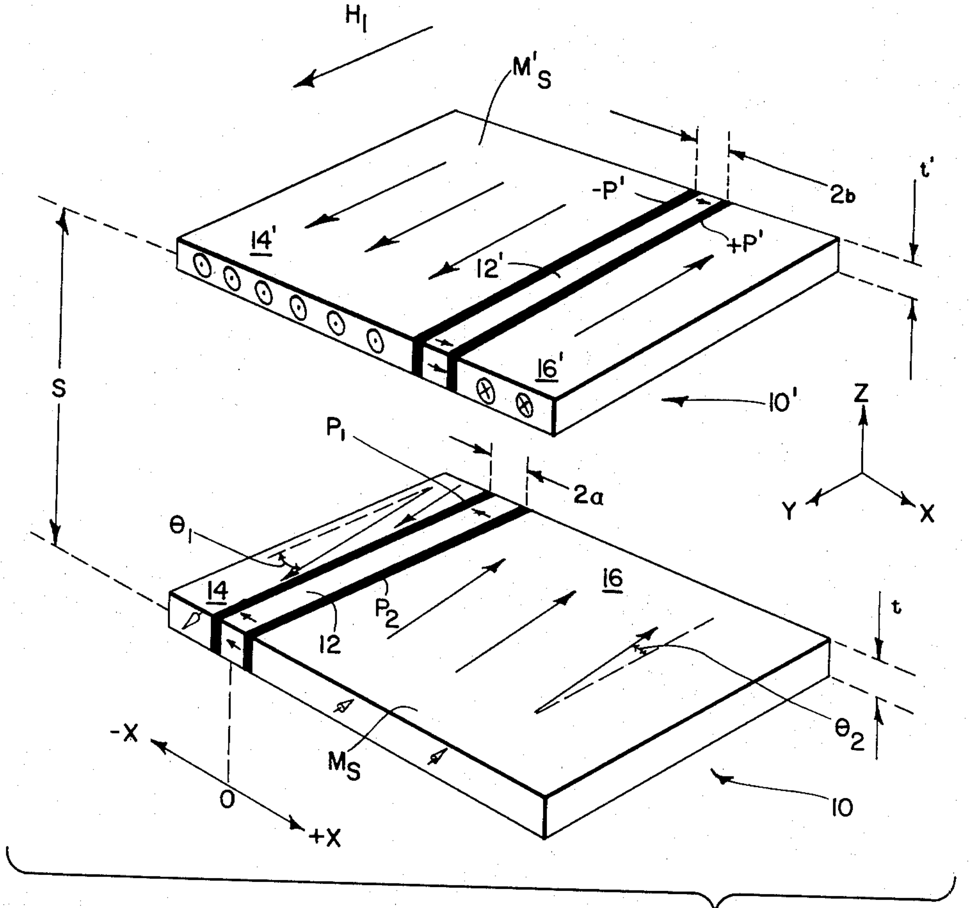

The present invention relates in general to shift registers and in particular to a magnetic shift register utilizing magnetic films and the magnetostatic interaction forces between regions thereof.

Non-mechanical shift registers in the prior art have commonly consisted of cascaded electron tube circuits and cascaded ferrite or wrapped metal foil toroidal cores. These devices, however, have the disadvantages of slow switching speed, large power requirements, and low storage density of data. The present invention intends to overcome these limitations by the use of controlled interdomain wall motion in a magnetic film to step data along the length of a magnetic shift register.

Accordingly it is the primary object of the present invention to provide a new and novel shift register.

It is another object of this invention to provide a shift register characterized by high data storage density, fast switching speed, and low power requirements.

It is a further object of this invention to provide new and novel methods and techniques for shifting data utilizing the magnetostatic interaction forces between localized regions of magnetic films.

In the present invention, a magnetic storage film is placed in close proximity with one or more magnetic control films. The magnetic control film has localized static control regions therein, each of which regions creates an external magnetic field. These control regions may be interdomain walls, small separations in the magnetic control film giving rise to a dipolar field, or large separations giving rise to a unipolar field. These magnetic films may be between 100 A. and 10,000 A. in thickness and commonly consist of a ferromagnetic material, such as, for example, Fe, Ni, Co, or MnBi. An interdomain wall in a magnetic film constitutes a transition region between magnetic domains of substantially opposite orientation; when the magnetization vectors of the interdomain wall rotate in the plane of the film (assuming the magnetization vectors of the domains lie also in the plane of the film), the interdomain wall is termed a Néel wall; when they rotate out of the plane of the film, they are termed Bloch walls. The data to be shifted is placed in the magnetic storage film by a writing coil and is propagated along the length thereof by a magnetic driving field. The stored data is represented by either the presence or absence of interdomain walls or by the sense of such walls. The external magnetic field of the data walls and the external magnetic field of the control regions interact and give rise to magnetostatic interaction forces which can impede the motion of the data walls. The magnitude of such interaction forces can be regulated and hence the data walls can be shifted from one control region to another by the application of a sequence of magnetic control fields. The presence of such data walls is sensed at the output end of the magnetic storage film by a readout coil which produces an output signal corresponding to the data.

Figure 1B:
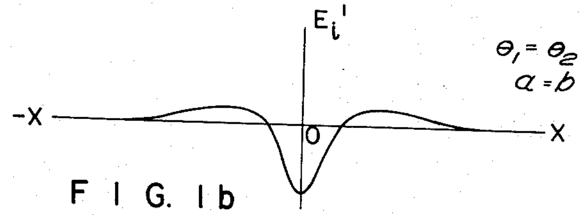
Figure 1C:
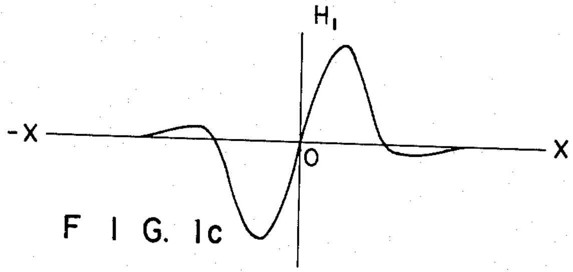
Figures 2A, 2B, 2C:
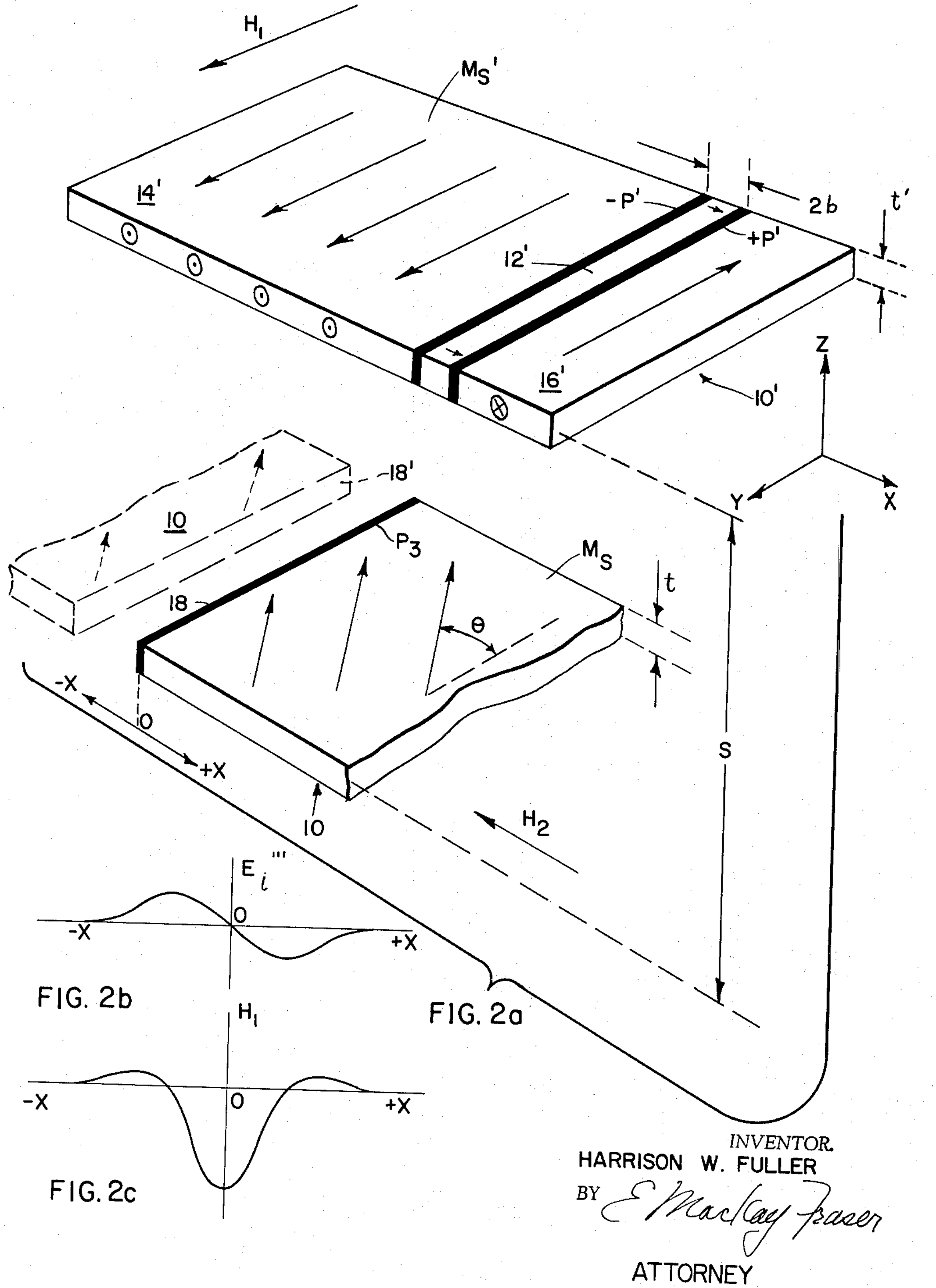
Figures 3, 3A:
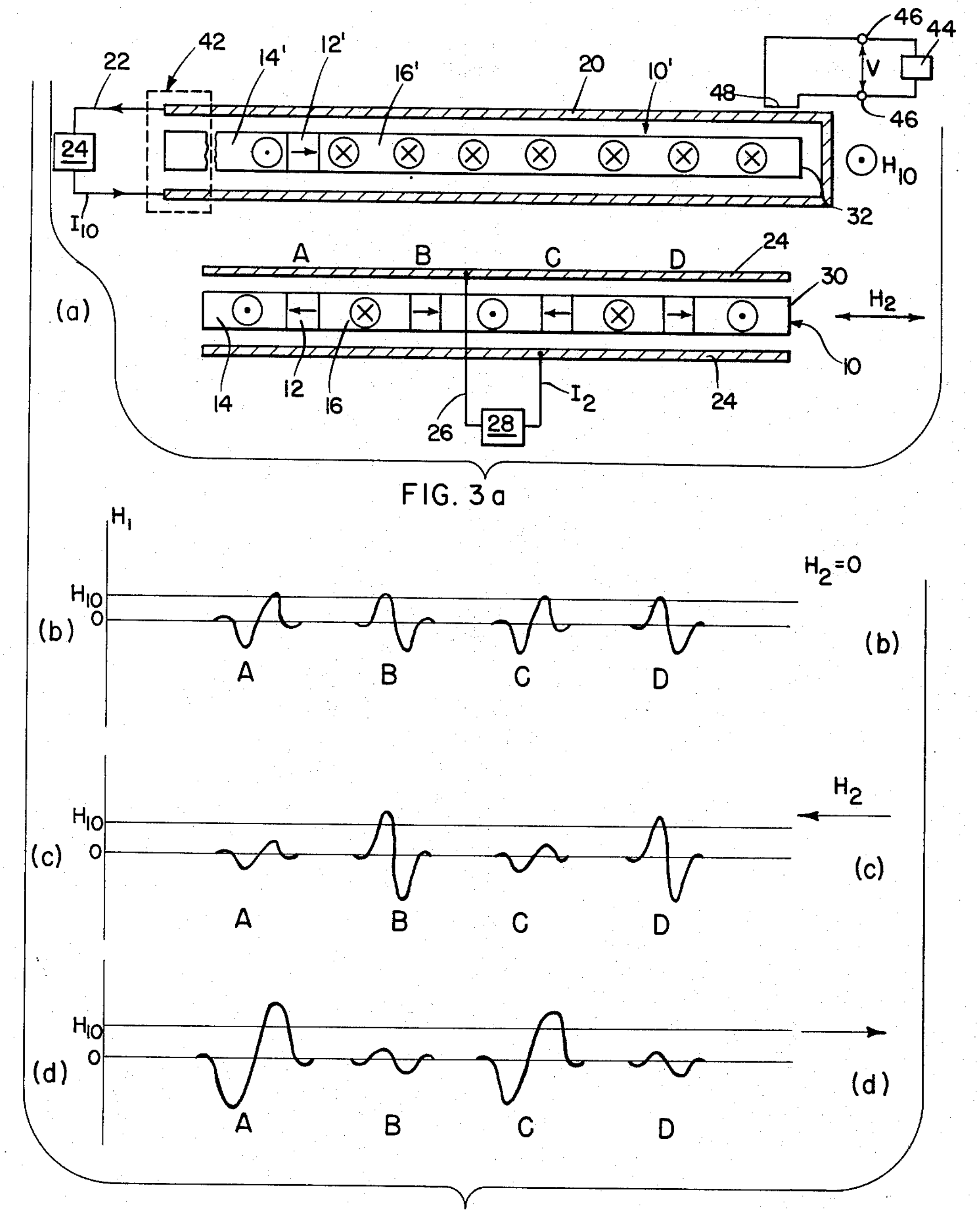
Figure 4A:
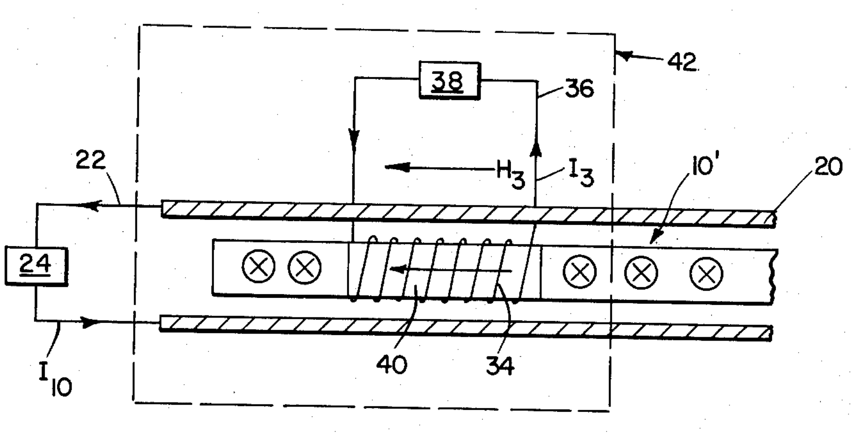
Figure 4B:
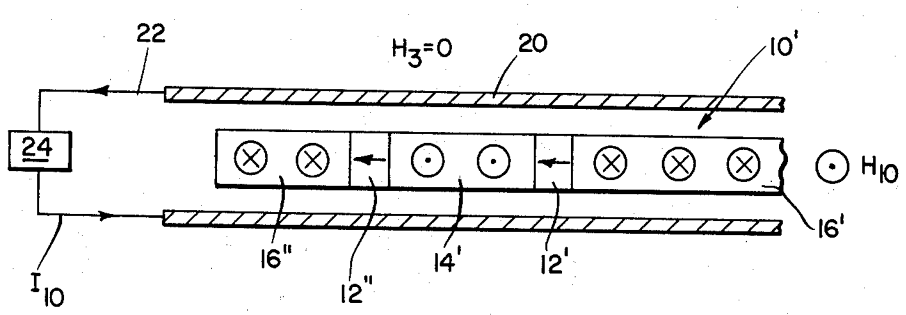
Figure 4C:
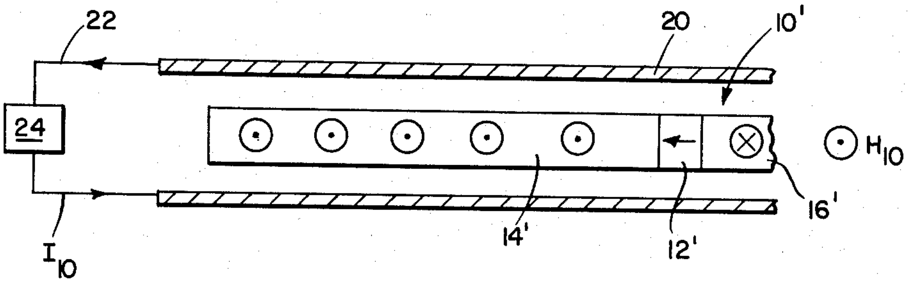
Figure 5A:
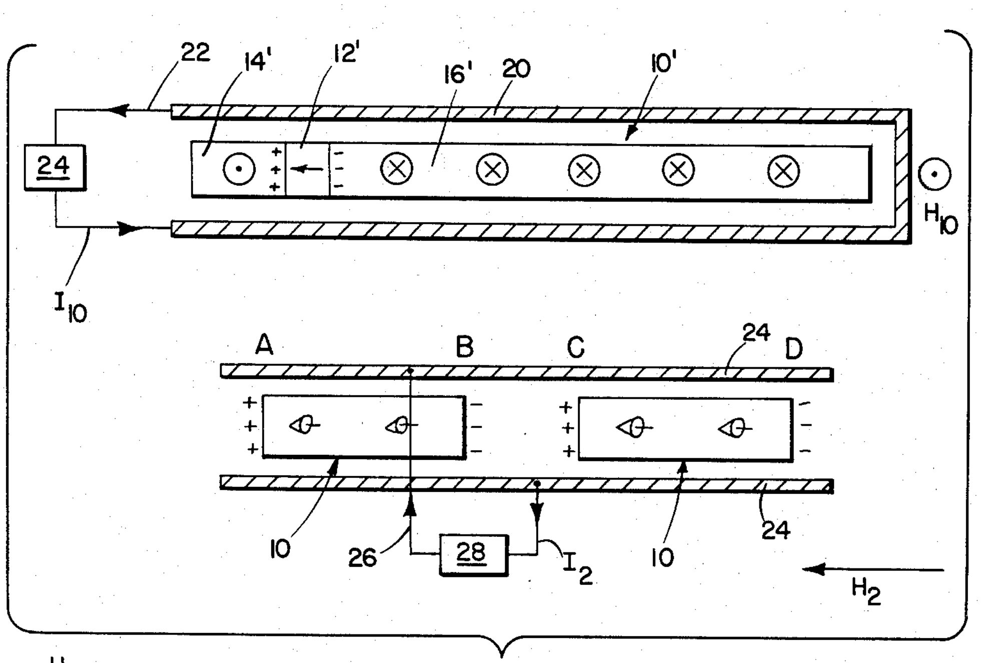
Figure 5B:
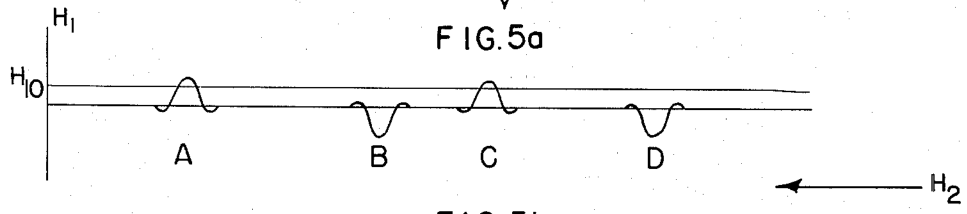
Figure 5C:
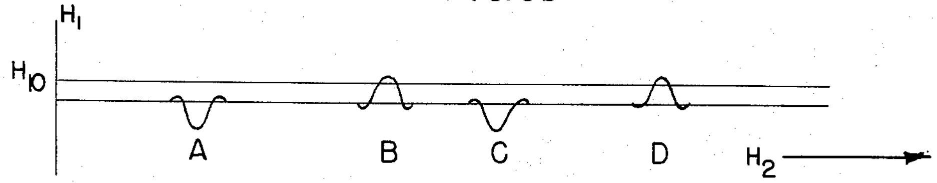
Figure 5D:
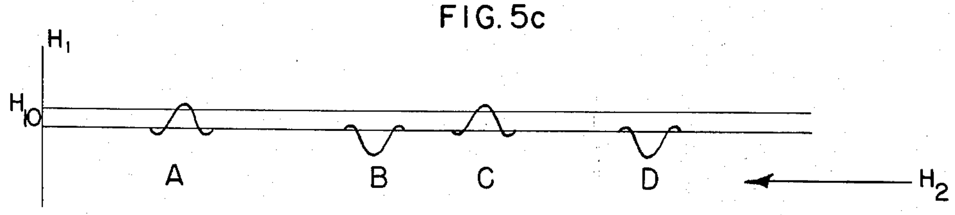
Figure 6:
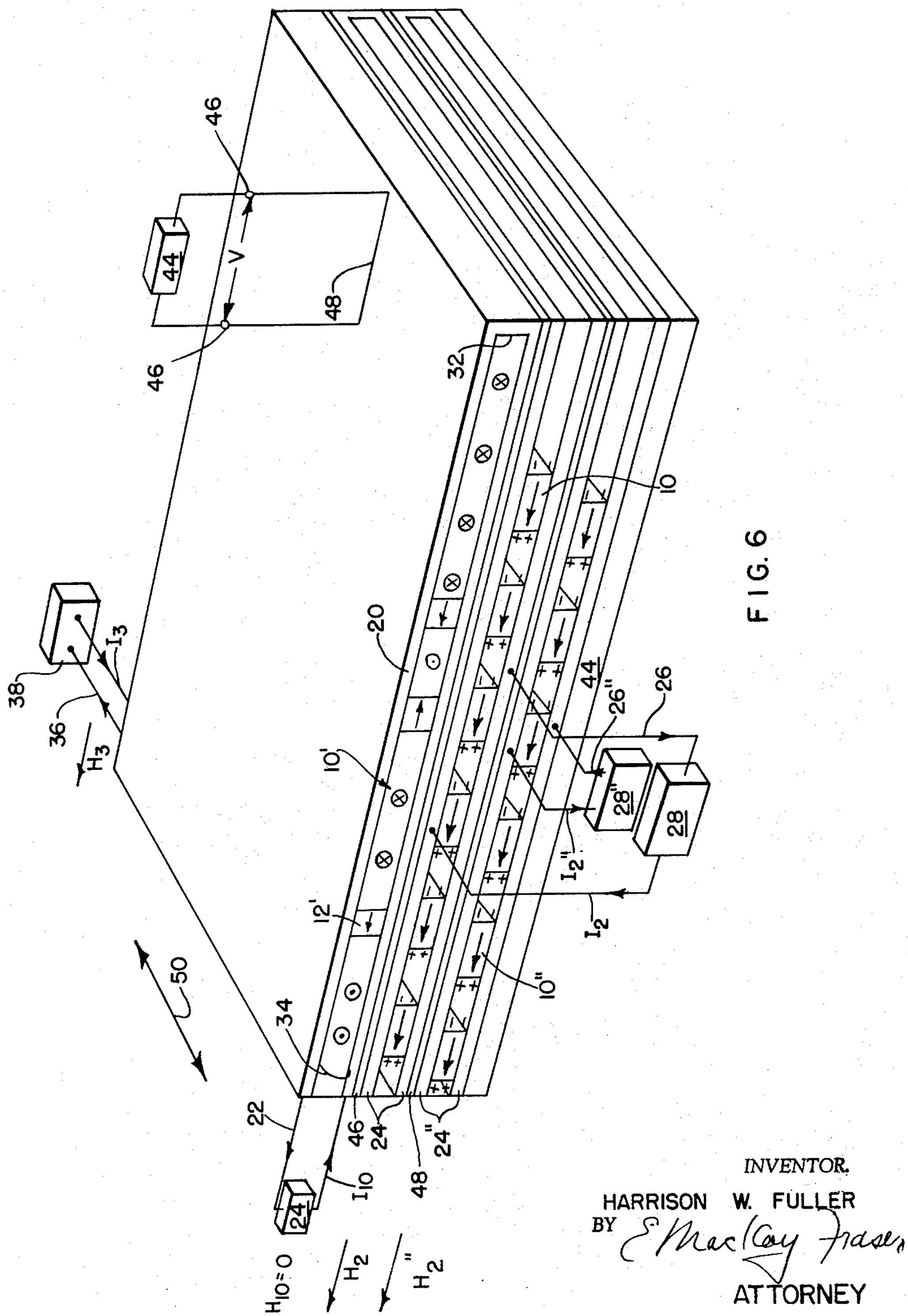
Figures 7A, 7B:
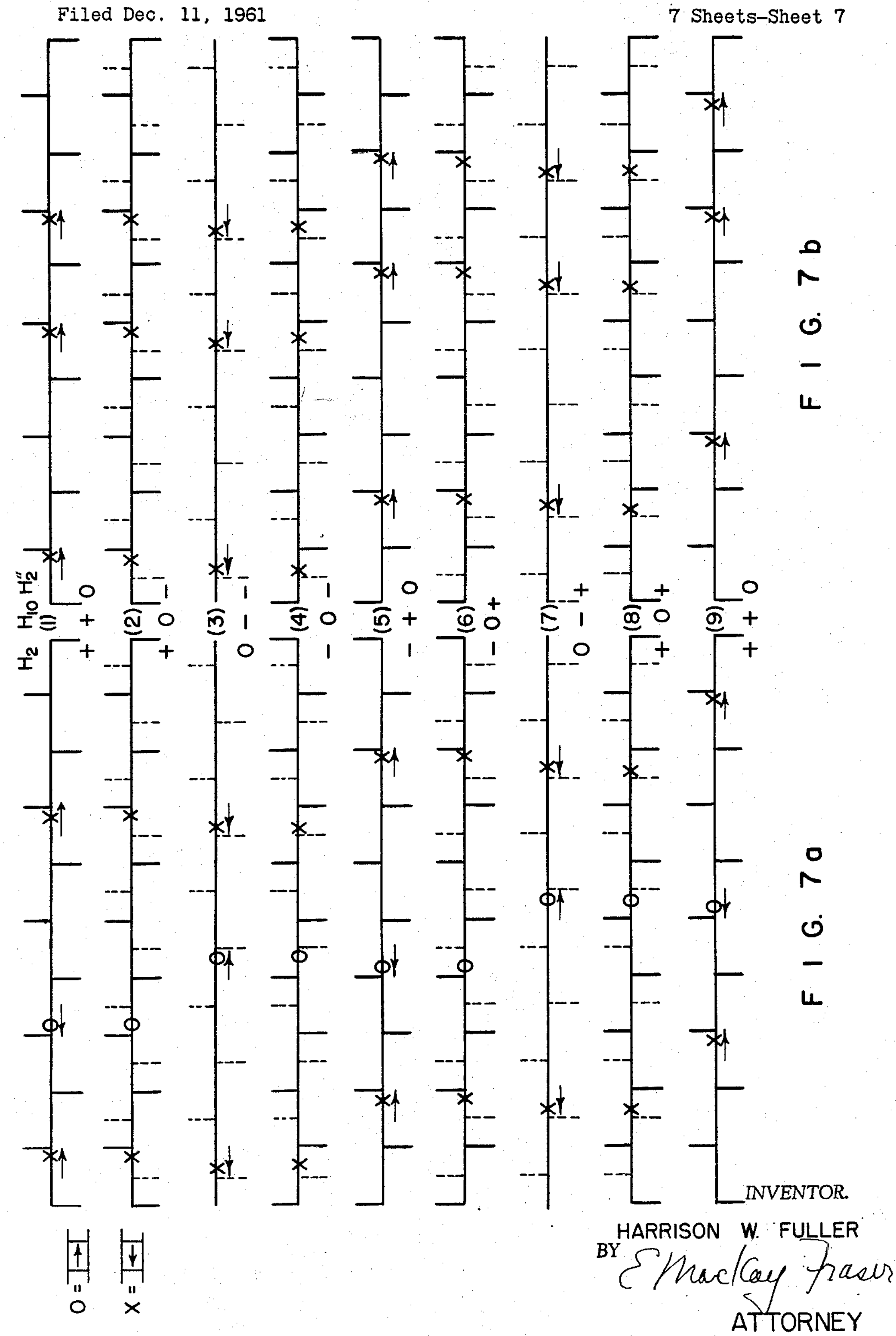

These and other features of the invention together with further objects and advantages thereof will become apparent from the following detailed specification with reference to the accompanying drawings in which:

FIG. 1, illustrates the spatial relationship of interacting Néel walls in adjacent magnetic films;

FIGS. 1*b* and 1*c* are plots of the magnetostatic interaction energy and equilibrium field for the configuration in FIG. 1*a*;

FIG. 2*a* illustrates the spatial relationship of a Néel wall and an edge discontinuity in adjacent magnetic films;

FIGS. 2*b* and 2*c* are plots of the magnetostatic interaction energy and equilibrium field for the configuration in FIG. 2*a*;

FIG. 3*a* illustrates a first embodiment of the present invention;

FIGS. 3*b*, 3*c* and 3*d* graphically illustrate the method of operation of the embodiment in FIG. 3*a*;

FIGS. 4*a*, 4*b*, and 4*c* illustrate apparatus for and method of generating interdomain walls in FIG. 3*a*;

FIG. 5*a* illustrates a second embodiment of the present invention omitting reading and writing means;

FIGS. 5*b*, 5*c* and 5*d* graphically illustrate the method of operation of the embodiment in FIG. 5*a*;

FIG. 6 illustrates a preferred embodiment of the present invention;

FIGS. 7*a* and 7*b* illustrate graphically the shifting of interdomain walls when a sequence of driving and control fields is applied to the embodiment in FIG. 6.

The magnetostatic interaction energy between two Néel walls or between a Néel wall and an edge discontinuity in adjacent magnetic films may be calculated as a function of the wall-wall or the wall-edge separation distance using the spatial configuration shown in FIGS. 1*a* and 2*a*. It is to be understood that this representation is a simplified model and is given merely for purposes of illustration. The formulae given below are most suitable when the film thicknesses and the interdomain wall widths are small compared with the separation distance; it is also implied that the individual wall characteristics are not modified by the proximity of the adjacent film or by the proximity of an interdomain wall in the adjacent film.

In FIG. 1*a*, a magnetic film 10, having a thickness $t$ and a saturation magnetization $M_s$, is parallel to and spaced a distance $s$ from a second magnetic film 10′, having a thickness $t'$ and a saturation magnetization $M_s'$. The magnetization vectors of magnetic films 10 and 10′ lie in the "X—Y" plane, while the easy directions of magnetization of magnetic films 10 and 10′ are in the "±Y" direction. Magnetic film 10′ is divided into regions 14′ and 16′ by a Néel wall 12′ of width $2b$, while magnetic film 10 is divided into regions 14 and 16 by a Néel wall 12 of width $2a$. The magnetization vectors of regions 14 and 16 makes angles $\theta_1$ and $\theta_2$ respectively with the easy direction of magnetization. The positive and negative lobes of the continuous pole distributions for the walls 12 and 12′ are approximated by pairs of line charges with linear densities $\pm p'$ in magnetic film 10′ and $p_1$ and $p_2$ in magnetic film 10, where:

$$p_1 = M_s t(1+\sin\theta_1)$$
$$p_2 = -M_s t(1-\sin\theta_2)$$
$$p' = M_s' t'$$

If wall 12 is held stationary and the position of wall 12′ is varied a distance $x$ from wall 12, by a magnetic field $H_1$ in the "+Y" direction, the magnetostatic interaction energy of the walls 12 and 12′ is given by $$E_i = M_s M_s' t t' \left( \ln \frac{[s^2+(x+a-b)^2][s^2+(x-a+b)^2]}{[s^2+(x+a+b)^2][s^2+(x-a-b)^2]} + \sin\theta_1 \ln \frac{s^2+(x+a-b)^2}{s^2+(x+a+b)^2} - \sin\theta_2 \ln \frac{s^2+(x-a+b)^2}{s^2+(x-a-b)^2} \right) \quad (1)$$

If wall 12′ is a symmetrical 180° wall of the same width as wall 12 (i.e. $\theta_1=\theta_2=0$ and $a=b$), the magnetostatic interaction energy is given by $$E_i' = M_s M_s' t t' \ln \frac{[s^2+x^2]^2}{[s^2+(x+2a)^2][s^2+(x-2a)^2]} \quad (2)$$

When a magnetic field (not shown) is applied to magnetic film 10, causing $\theta_2=-\theta_1=\theta$, the magnetostatic interaction energy is given by, for the case $a=b$, $$E_i''=M_sM_s'tt'(1-\sin\theta)\ 1n\frac{[s^2+x^2]^2}{[s^2+(x+2a)^2][s^2+(x-2a)^2]} \quad (3)$$

Because of such a magnetic field, the interaction energy in Equation 3 has been reduced by the factor $(1-\sin\theta)$ from its value given in Equation 2.

In FIG. 1*b*, the magnetostatic interaction energy $E_i'$, in Equation 2, is plotted as a function of wall separation distance $x$ (along the "X" axis), for the configuration shown in FIG. 1*a*. In FIG. 1*c* the value of the equilibrium field $H_1$ required to move the wall 12' in the presence of wall 12 is shown. If the magnetization vectors in magnetic film 10 make an angle $\theta$ as in Equation 3 or if the polarity of wall 12 in magnetic film 10 is reversed, the magnitude of $E_i$ should be reduced or the entire plot should be inverted; the plot of $H_1$ will also have to be changed correspondingly. Although the description has been in terms of Néel walls, this type of analysis will apply equaly to configurations comprising Bloch walls or more complicated transition regions.

In FIG. 2*a*, the magnetic film 10 is a discontinuous film having a single line charge with a linear density $p_3$ at edge 18. The magnetization vectors of magnetic film 10 are oriented by field $H_2$ to make an angle $\theta$ with the "Y" direction. The value of the field $H_2$ required to rotate the magnetization vectors of magnetic film 10 an angle $\theta$ from the easy direction of magnetization is given by $$H^2=\frac{2K\sin\theta}{M_s}\theta<90° \quad (4)$$

where K is the uniaxial anistropy energy of the magnetic film 10 and is a constant for a particular specimen. The magnetostatic interaction energy between wall 12' and edge 18, as wall 12' is moved from left to right, can be calculated by letting $a=0$, $\theta_1=0$, and $\theta_2=\theta$ in Equation 1. These substitutions yield $$E_i'''=M_sM_s'tt'\sin\theta 1n\frac{s^2+(x-b)^2}{s^2+(x+b)^2} \quad (5)$$

It is seen that the effect of the magnetic field $H_2$ is to reduce the magnitude of $E_i'''$ from a maximum at $\theta=+90°$ to a minimum at $\theta=-90°$.

In FIG. 2*b*, the magnetostatic interaction energy $E_i'''$, in Equation 5, is plotted as a function of the wall-edge separation distance $x$, for the configuration shown in FIG. 2*a* and for $\theta$ greater than zero. In FIG. 2*c*, the value of the equilibrium field $H_1$ required to move the wall 12' in the presence of the edge 18 is shown. If $\theta$ is less than zero, $p_3$ changes from a positive to a negative line pole density and the plots in FIGS. 2*b* and 2*c* should be inverted. If the wall 12' is moved from right to left (instead of from left to right), the effect is as if $\theta$ were less than zero and the plots in FIGS. 2*b* and 2*c* would also be inverted.

If the adjacent edges of the discontinuous film 10 in FIG. 2*a* are brought closer together, the unipolar magnetic field at edge 18 will interact with the unipolar magnetic field at edge 18'. As the line charges are of opposite sign, a dipolar magnetic field will exist between edges 18 and 18' similar to the magnetic field of a Néel wall. The magnitude of the magnetostatic interaction energy arising from such a dipolar magnetic field can also be controlled by the application of the magnetic field $H_2$.

In FIG. 3*a* a cross-sectional view of a first embodiment of the present invention is illustrated. A magnetic storage film 10', divided into domains of opposite polarity 14' and 16' by an interdomain wall 12', is parallel to a magnetic control film 10 which has a series of domains of opposite polarity 14 and 16 therein separated by a series of interdomain walls 12 located at fixed positions A through D. Each of the magnetic films 10 and 10' has an easy direction of magnetization normal to the surface of the paper. A current $I_{10}$, generated by a constant current source 24, flows through leads 22 and conducting film 20 (which encircles magnetic film 10') and generates a constant magnetic driving field $H_{10}$ normal to the plane of the paper. The magnetic driving field $H_{10}$ is of insufficient strength to nucleate an interdomain wall but is able to cause domain reversal and hence propagate the interdomain wall 12' toward edge 32; the magnitude of such a driving field is approximately one-half the magnitude required for a nucleating field. A current $I_2$, generated by a variable current source 28, flows through leads 26 and conducting film 24 (which encircles magnetic control film 10) and generates a magnetic control field $H_2$ parallel to the plane of the paper and normal to edge 30. The magnetic control field $H_2$ is of sufficient strength to rotate the magnetization vectors of domains 14 and 16 an angle $\theta$ from their initial direction (normal to the plane of the paper). The interdomain wall 12' is generated by a writing means 42, described more fully in FIG. 4; the presence of the interdomain wall 12' at edge 32 is sensed by a reading coil 48 which generates a voltage V across terminals 46, such a voltage V being detected by a detecting device 44.

The method of operation of the apparatus of FIG. 3*a* is illustrated in FIGS. 3*b*, 3*c* and 3*d*. In FIG. 3*b*, the magnitude of the magnetic driving field $H_{10}$ is such that driving field $H_{10}$ is insufficient to overcome the magnetostatic interaction forces at positions A through D and hence interdomain wall 12', after being introduced by writing means 42, is stopped at position A. The magnetic control field $H_2$ is initially zero and therefore the maximum value of equilibrium field $H_1$ (see FIG. 1*c*) is substantially the same at all positions A through D. In FIG. 3*c*, the magnetic control field $H_2$ is shown pointing to the left. The effect of such a field is described by Equation 3; the magnetization vectors in domains 14 and 16 are rotated an angle $\theta$, clockwise and counterclockwise respectively, causing the magnetostatic interaction energy (and hence the equilibrium field $H_1$) to decrease at positions A and C and to increase at positions B and D. The magnitude of $\theta$ is given by Equation 4. The wall 12' then moves to position B and is impeded by the large magnetostatic interaction forces at that position. In FIG. 3*d*, the magnetic control field $H_2$ has been reversed, the magnetostatic interaction energy has been increased at positions A and C and reduced at positions B and D, and the interdomain wall 12' moves to position C where it is again impeded. In such a manner, the magnetic control field $H_2$ steps the interdomain wall 12' toward edge 32 where it can be sensed by reading coil 48.

In FIG. 4*a*, a writing coil 34 is shown encircling a region 40 of the magnetic storage film 10'. A data signal source 38 generates a writing current $I_3$ which flows through leads 36 and writing coil 34 and creates a writing field $H_3$ which rotates the magnetization vectors of region 40 into the plane of the paper, i.e. normal to the easy direction of magnetization. In FIG. 4*b*, the writing field $H_3$ is reduced to zero and the driving field $H_{10}$, shown coming out of the paper, causes the magnetization vectors of region 40 to assume a position opposite in direction to the magnetization vectors of magnetic storage film 10'. In such a manner, domains 14', 16' and 16'' and walls 12' and 12'' are created. If writing field $H_3$ were of the opposite sense, the interdomain walls 12' and 12'' would also be of the opposite sense. In FIG. 4*c*, the driving field $H_{10}$ has caused the wall 12' to move to the right (while wall 12'' has moved to the left and off of the magnetic storage film 10', thus erasing domain 16''). The writing coil 34 could also be a flat conducting strip parallel to and above the surface of magnetic storage film 10' and normal to the plane of the paper.

In FIG. 5*a*, a cross sectional view of a second embodiment of the invention is illustrated. The writing and reading means have been omitted for simplicity, and the applicable reference numerals have been retained. The magnetic control film 10 is now composed of discrete segments with positive poles at positions A and C and negative poles at positions B and D; the magnetic control field $H_2$ is pointing to the left causing the magnetization vectors to rotate counterclockwise an angle $\theta$ from the easy direction of magnetization (normal to the plane of the paper). The magitude of $\theta$ is again given by Equation 4. The magnetostatic interaction energy $E_i'''$ for this configuration (and with the interdomain wall 12' moving from left to right) is described by Equation 5, while the plot of the equilibrium field $H_1$ (see FIG. 2*c*) is shown in FIG. 5*b*; if the interdomain wall 12' is moved from right to left, the plots of the equilibrium field $H_1$ should be inverted.

In FIG. 5*b*, the control field $H_2$ is pointing to the left and the magnitude of the driving field $H_{10}$ is insufficient to overcome the magnetostatic interaction forces at position A. In FIG. 5*c*, the control field is reversed causing the magnetization vectors of control film 10 to rotate clockwise an angle $\theta$ from the easy direction of magnetization and hence causing negative poles to form at positions A and C and positive poles at positions B and D. The driving field $H_{10}$ then moves the interdomain wall 12' past position A to position B where it is impeded by the magnetostatic interaction forces. In FIG. 5*d*, the direction of control field $H_2$ is again reversed and wall 12' proceeds to position C.

The discontinuous magnetic control film 10 may be constructed by a variety of techniques. The magnetic material may be vacuum deposited through a masking structure or it may be deposited continuously and then preferentially etched using well known photoresist techniques. A preferred technique would consist of vacuum depositing the magnetic material onto a plastic replica of a ruled grating. If the deposition is done at an angle, the grooves in the replica will cast a shadow and thus a discontinuity will be produced in the bottom of each groove. The magnetic storage film 10' may also be vacuum deposited along with the conducting films 20 and 24 and any desired insulating films (such as insulating layers 46 and 48 in FIG. 6).

In FIG. 6 a preferred embodiment of the present invention is illustrated. The apparatus comprises a nonconductive substrate 44 on which are laid in the following order: a first segmented magnetic control film 10'' encircled by its associated conductor 24'', a first insulating layer 48, a second segmented magnetic control film 10 encircled by its associated conductor 24, a second insulating layer 46, and a magnetic storage film 10' encircled by its associated conductor 20. The segmented magnetic control films 10 and 10'' are fabricated by any of the techniques previously described and are placed in such a manner that the interdomain wall 12' in magnetic storage film 10' interacts alternately with the magnetic poles of the segmented magnetic control films 10 and 10''. The order in which the magnetic media and their associated conductors are deposited is not significant in the operation of the device. Since the conducting films 20, 24 and 24'' encircle their respective magnetic films, the magnetic fields $H_{10}$, $H_2$ and $H_2''$ are self-cancelling outside of the respective conducting films 20, 24 and 24''; all of the elements of the apparatus can then be very closely stacked resulting in high density information storage. The magnetic fields $H_{10}$, $H_2$ and $H_2''$ are created by currents $I_{10}$, $I_2$ and $I_2''$ generated by current sources 24, 28 and 28'' and flowing through leads 22, 26 and 26'' and conducting films 20, 24 and 24'' respectively. The magnetic films 10', 10 and 10'' have easy directions of magnetization represented by the arrow 50. The data is written into the magnetic storage medium by a writing field $H_3$ (in conjunction with driving field $H_{10}$) created by current $I_3$, which current is generated by current signal source 38 and flows through leads 36 and writing coil 34. The data is readout at edge 32 by reading coil 48 which generates a voltage V between terminals 46, which voltage in turn is sensed by detecting device 44. The control fields $H_2$ and $H_2''$ each individually rotate the magnetization vectors of segmented magnetic control films 10 and 10'' clockwise or counterclockwise; when the control fields $H_2$ and $H_2''$ are reduced to zero, the magnetization vectors spontaneously fall back along the easy direction of magnetization. The entire structure should be provided with a suitable enclosure to shield it from stray electric and/or magnetic fields.

The method of operation of the apparatus in FIG. 6 is best described with reference to FIGS. 7*a* and 7*b*. Magnetic fields $H_2$, $H_{10}$ and $H_2''$ are applied to their respective magnetic films 10, 10' and 10'' in a sequence of steps (1) through (9); the magnetic control fields $H_2$ and $H_2''$ are termed positive when pointing to the left while the driving field $H_{10}$ is positive when pointing out of the plane of the paper. The steps (1) through (9) and the values of magnetic fields $H_2$, $H_{10}$, and $H_2''$ are shown in columnar form between FIGS. 7*a* and 7*b*. A positive spike represents a positive pole and a solid spike represents a pole in magnetic control film 10; a negative spike represents a negative pole and a dashed spike represents a pole in magnetic control film 10''. A "0" represents a Néel wall having an external field pointing to the right while an "*x*" represents a Néel wall of opposite sense. The motion of a wall when the driving field $H_{10}$ is applied is represented by an arrow directly below it. It is seen that a positive pole impedes an "*x*" wall travelling to the right and an "0" wall travelling to the left; a negative pole impedes an "0" wall travelling to the right and an "*x*" wall travelling to the left. The configuration of walls and poles shown in FIG. 6 is represented by step (8) in FIG. 7*a*.

In FIG. 7*b*. the central Néel wall, represented as an "0" wall, has been changed in sign and is now represented as an "*x*" wall. When the same sequence of stepping operations is applied as in FIG. 7*a*, the three Néel walls are shifted two pole positions along the magnetic storage film 10' as was done in FIG. 7*a*; thus the sense of the Néel wall is not critical for the stepping operation of the invention. If it is desired to use the sense of the wall (i.e. a "0" or an "*x*") instead of the presence or absence thereof, the time at which a wall is sensed becomes the determining factor. In step (5) of FIGS. 7*a* and 7*b*, the two central walls move in opposite directions upon the application of the driving field $H_{10}$; if the end of the register were at the fourth positive pole from the left, the "*x*" wall would be sensed at this time, while the "0" wall would be sensed in step (3) of the following cycle.

The present invention thus provides a magnetic shift register which is planar in construction and can be fabricated by thin film evaporation techniques. Since the assembly is very thin and any external field can be cancelled by paired conductors, many such assemblies can be stacked to yield high volume efficiency. As the interdomain wall spacing can be made of the order of one micron, high data density in the propagation direction is readily achievable. Although the currents required to produce the magnetic fields may be large, the voltages are very small and hence the power requirements also quite small. Furthermore, since interdomain wall velocities are of the order of $10^4$ cm./sec., information rates (and hence switching speeds) in the multi-megacycle region are obtainable.

Having thus described the invention, it will be apparent that numerous modifications and departures, as explained above, may now be made by those skilled in the art and which fall within the scope of the invention. Consequently the invention herein disclosed is to be construed as limited only by the spirit and scope of the appended claims.

What is claimed is:

1. A magnetic shift register comprising a magnetic storage medium; writing means at the input end of said magnetic shift register for establishing interdomain walls in said magnetic storage medium in accordance with input data, each of said interdomain walls having an external magnetic field associated therewith; driving means for propagating each of said interdomain walls along the length of said magnetic storage medium; one or more magnetic control media in close proximity with said magnetic storage medium, said magnetic control media having regions therein adapted to obstruct the motion of each of said interdomain walls propagated along the length of said magnetic storage medium and each of said regions having an external magnetic field associated therewith; control means for regulating the magnitude of the magnetostatic interaction forces existing between each of said interdomain walls in said magnetic storage medium and each of said regions in said magnetic control media whereby each of said interdomain walls is shifted in a preselected manner along the length of said magnetic storage medium, said magnetostatic interaction force arising out of the interaction of the external magnetic field of each of said interdomain walls with the externl magnetic field of each of said regions; and reading means at the output end of said magnetic shift register to detect the presence of said interdomain walls in said magnetic storage medium and to generate an output signal representative of the data.

2. The apparatus of claim 1 wherein said magnetic storage medium and said magnetic control media consist of thin ferromagnetic films, and said driving means and said control means include thin non-magnetic conducting films.

3. The apparatus of claim 2 wherein said magnetic storage film has an easy direction of magnetization lying substantially parallel to the surface of said magnetic storage film and substantially normal to the direction of propagation of said interdomain walls.

4. The apparatus of claim 2 wherein said magnetic control films have easy directions of magnetization lying substantially parallel to the surface of said magnetic control films and substantially normal to the direction of propagation of said interdomain walls.

5. A magnetic shift register comprising a magnetic storage medium, a writing coil at the input end of said magnetic storage medium adapted to establish interdomain walls therein, means for energizing said input coil in accordance with the input data, a first non-magnetic conducting medium adapted to generate a first magnetic field to propagate each of said interdomain walls along the length of said magnetic storage medium, means for energizing said first non-magnetic conducting medium, a first magnetic control medium in close proximity with said magnetic storage medium and having fixed regions therein adapted to obstruct the motion of each of said propagated interdomain walls, a second non-magnetic conducting medium adapted to rotate the magnetization vectors of said first magnetic control medium to regulate the magnitude of the magnetostatic interaction force existing between each of said interdomain walls and each of said fixed regions, means for energizing said second non-magnetic conducting medium to shift each of said interdomain walls in a preselected manner along the length of said magnetic storage medium, and a reading coil at the output end of said magnetic shift register to detect the presence of said interdomain walls in said magnetic storage medium and to generate an output signal representative of the data.

6. The apparatus of claim 5 wherein said fixed regions consist of interdomain walls.

7. The apparatus of claim 5 wherein said fixed regions consist of discontinuities in said magnetic control medium.

8. The apparatus of claim 5 and in addition a second magnetic control medium in close proximity with said magnetic storage medium and having fixed regions therein adapted to obstruct the motion of each of said propagated interdomain walls, a third non-magnetic conducting medium adapted to rotate the magnetization vectors of said second magnetic control medium, and means for energizing said third non-magnetic conducting medium.

No references cited.